United States Patent
Faucher et al.

(10) Patent No.: US 12,421,330 B2
(45) Date of Patent: Sep. 23, 2025

(54) POLYMER AND ITS PREPARATION METHOD

(71) Applicant: SNF Group, Andrezieux Boutheon (FR)

(72) Inventors: Gatien Faucher, Andrezieux Boutheon (FR); Damien Fougerouse, Andrezieux Boutheon (FR); Cyril Barriere, Andrezieux Boutheon (FR)

(73) Assignee: SNF GROUP, Andrezieux Boutheon (FR)

( * ) Notice: Subject to any disclaimer, the term of this patent is extended or adjusted under 35 U.S.C. 154(b) by 0 days.

(21) Appl. No.: 18/873,218

(22) PCT Filed: Jun. 23, 2023

(86) PCT No.: PCT/EP2023/067191
§ 371 (c)(1),
(2) Date: Dec. 9, 2024

(87) PCT Pub. No.: WO2023/247783
PCT Pub. Date: Dec. 28, 2023

(65) Prior Publication Data
US 2025/0171568 A1    May 29, 2025

(30) Foreign Application Priority Data
Jun. 24, 2022   (FR) ..................... 2206322

(51) Int. Cl.
C08F 8/28 (2006.01)
C08F 285/00 (2006.01)
D21H 17/37 (2006.01)
D21H 21/18 (2006.01)
D21H 27/10 (2006.01)

(52) U.S. Cl.
CPC ............. *C08F 8/28* (2013.01); *C08F 285/00* (2013.01); *D21H 17/37* (2013.01); *D21H 21/18* (2013.01); *D21H 27/10* (2013.01)

(58) Field of Classification Search
USPC ............................................. 525/154, 328.2
See application file for complete search history.

(56) References Cited

U.S. PATENT DOCUMENTS

| | | | |
|---|---|---|---|
| 4,605,702 A * | 8/1986 | Guerro ...................... | C08F 8/28 525/154 |
| 10,730,989 B2 | 8/2020 | Horii et al. | |
| 10,759,746 B2 | 9/2020 | Favero et al. | |
| 2005/0161181 A1* | 7/2005 | St. John ................. | D21H 21/10 162/168.3 |
| 2011/0056640 A1 | 3/2011 | Cyr et al. | |
| 2017/0247489 A1 | 8/2017 | Tekobo et al. | |

FOREIGN PATENT DOCUMENTS

| | | |
|---|---|---|
| FR | 2987375 A1 | 8/2013 |
| WO | 2021123599 A1 | 6/2021 |

OTHER PUBLICATIONS

International Search Report and Written Opinion of the International Searching Authority for PCT/EP2023/067191 mailed on Oct. 12, 2023.

* cited by examiner

*Primary Examiner* — Fred M Teskin
(74) *Attorney, Agent, or Firm* — HESLIN ROTHENBERG FARLEY & MESITI P.C.

(57) ABSTRACT

This invention relates to a new water-soluble dialdehyde-functionalized polymer its preparation method and use, notably for application in the field of paper or cardboard manufacturing.

20 Claims, No Drawings

POLYMER AND ITS PREPARATION METHOD

CROSS REFERENCE TO RELATED APPLICATIONS

This application is a national stage filing under section 371 of International Application No. PCT/EP2023/067191 filed on Jun. 23, 2023, and published on Dec. 28, 2023, as WO 2023/247783, which claims priority to French Application No. 2206322, filed on Jun. 24, 2022. The entire contents of WO 2023/247783 are hereby incorporated herein by reference.

TECHNICAL FIELD OF THE INVENTION

This invention relates to a novel water-soluble dialdehyde-functionalized (advantageously glyoxal-functionalized) polymer, the preparation method and use thereof, in particular for application in the field of paper or cardboard manufacturing.

PRIOR ART

The paper industry is in constant search for improvements of its manufacturing processes for paper, cardboard or the like, in particular with regard to costs reduction, yield, productivity and even the end-product properties.

Water-soluble dialdehyde-functionalized polyacrylamides are widely used in paper manufacturing processes, in particular to improve the dry strength of these papers. These water-soluble polyacrylamides are mainly made from non-ionic, cationic, anionic or amphoteric polymers, called base polymers, on which a dialdehyde is reacted with.

Document US20110056640 describes a paper manufacturing method implementing a compound resulting from the reaction between a dialdehyde-functionalized and an acrylamide/diallyldimethyl ammonium chloride copolymer. This method only improves drainage.

The Applicant's document FR2987375 describes an improved paper manufacturing process involving a base copolymer containing a polyfunctional compound incorporated during the polymerization of the base copolymer monomers, and its reaction with a dialdehyde, the incorporation of a polyfunctional compound allows improvement of the dry strength and the drainage performances of the paper.

Document US20170247489 describes a paper preparation process using a terpolymer obtained by copolymerizing a base polymer with glyoxal, the base polymer being obtained by copolymerizing a primary amide-containing monomer and a cationic monomer.

Document U.S. Pat. No. 10,730,989 relates to a process for preparing a papermaking (meth)acrylamide copolymer-based additive.

Currently, the dialdehydation process (in particular glyoxalation) has two main problems.

The first is that the dialdehyde-functionalized polyacrylamide products (in particular glyoxal-functionalized) available on the market contain a large number of unreacted amide groups, that may react with dialdehyde (especially glyoxal) during storage, leading to continuous cross-linking of the base polyacrylamide molecules and reduce the shelf-life of the product. In addition, in practice, polyacrylamides contain relatively small quantities of ionic monomers, generally less than about 5 mol percent, which limits the contribution of the ionic charge of these polymers.

The second problem relates to the acid treatment used to stop the reaction between the dialdehyde and the base polymer, which is associated with a significant drop in the viscosity of the aqueous polymer solution. The polymers thus obtained show reduced application performances.

The Applicant has, surprisingly, discovered that the synthesis of a polymer according to a particular method allows increasing its molecular weight without impacting its viscosity. It seems that this increase of the base polymer molecular weight gives the paper improved applicative performances in terms of dry strength, compared to existing prior art solutions, while improving drainage, thus making possible an increase in the paper machine speed, therefore, a productivity improvement.

The use of the polymers that result from the invention is part of a general principle of product performance improvement and, more particularly, of the dry strength and drainage properties. The better performances of the polymers according to the invention make it possible to reduce the quantity of product required to the application, which therefore involves a reduction of greenhouse gas emissions such as carbon dioxide associated with the manufacture and the use of synthetic polymers.

DISCLOSURE OF THE INVENTION

This invention relates to a water-soluble dialdehyde-functionalized polymer comprising:
- at least one monomer A: cationic or anionic;
- at least one monomer B: non-ionic;
- at least one structuring system comprising:
  (i) at least one compound I, different from the at least one monomer A, selected from: allylsulfonic acid, methallylsulfonic acid, allyldisulfonic acid, methallyldisulfonic acid, salts and mixtures thereof;
  (ii) at least one compound II of formula (1), different from the at least one monomer B:

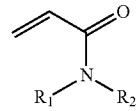

Formula (1)

wherein $R_1$ and $R_2$ being, independently of one another, a hydrogen atom, a methyl group, an ethyl group, an isopropyl group or a $CH_2$—OH group;
wherein $R_1$ and $R_2$ are not both a hydrogen atom ($R_1 \neq H$ when $R_2 = H$; $R_2 \neq H$ when $R_1 = H$);
optionally, at least once monomer C: zwitterionic or hydrophobic,
optionally, at least one cross-linking agent,
optionally, at least one transfer agent.

This water-soluble dialdehyde-functionalized polymer is obtained according to the following steps:
a) formation of a solution (S1) comprising at least a first fraction (F1) containing (1) at least one monomer selected from monomers A and B and (2) at least one compound selected from compounds I and II;
b) polymerization 1 (PO1) of the fraction F1 to form a solution of a first gradient polymer (PG1);
c) addition to the solution comprising PG1, of a second fraction (F2) containing (1) at least one monomer selected from monomers A and B and (2) at least one compound selected from compounds I and II;

d) polymerization 2 (PO2) of the fraction F2 on PG1 in order to form a solution of a second gradient polymer (PG2);
e) addition, to the solution comprising PG2 of a third fraction (F3) containing (1) at least one monomer selected from monomers A and B and (2) at least one compound selected from compounds I and II;
f) polymerization 3 (PO3) of the fraction F3 on PG2, in order to form a solution comprising a base polymer;
g) dilution of the solution comprising the base polymer and reaction between the at least one dialdehyde (advantageously glyoxal) and the base polymer to obtain a water-soluble dialdehyde-functionalized polymer (advantageously glyoxalated) and at least one of the fractions F1, F2 or F3 contains at least one monomer A,
at least one of the fractions F1, F2 or F3 contains at least one monomer B,
at least one of the fractions F1, F2 or F3 contains at least one compound I and
at least one of the fractions F1, F2 or F3 contains at least one compound II.

The monomer A is only cationic or only anionic. This is not a mixture of cationic and anionic monomers.

When monomer A is anionic, the water-soluble dialdehyde-functionalized polymer does not comprise a cationic monomer.

When monomer A is cationic, the water-soluble dialdehyde-functionalized polymer does not comprise an anionic monomer, with the exception of compound I.

This invention also relates to the preparation method for this water-soluble dialdehyde-functionalized polymer (advantageously glyoxalated).

This invention also relates to a paper or cardboard manufacturing process implementing this water-soluble dialdehyde-functionalized polymer (advantageously glyoxalated).

This invention also relates to the use of this water-soluble dialdehyde-functionalized polymer (advantageously glyoxal-functionalized) in the recovery of hydrocarbons (oil and/or gas); in the drilling or cementing of wells (in particular, hydrocarbon wells); in the stimulation of hydrocarbon wells (oil and/or gas), for example, in the hydraulic fracturing, conformance, diversion; in open, closed or semi-closed circuit water processing; in the treatment of fermentation musts; in the treatment of sludges; in construction; in lumber treatment; in the treatment of hydraulic composition (concrete, cement, mortar and aggregates); in the mining industry; in the formulation of cosmetic products; in the formulation of detergents; in textile manufacturing; in the geothermal sector; in the manufacture of sanitary napkins; or in agriculture.

The invention also relates to the use of the polymer according to the invention as a flocculant, coagulant, binding agent, fixing agent, viscosity-reducing agent, thickening agent, absorption agent, friction-reducing agent, drainage agent, charge-retaining agent, dehydrating agent, conditioning agent, stabilizing agent, fixing agent, film-forming agent, sizing agent, superplasticizer agent, clay inhibitor or dispersant.

DESCRIPTION OF THE INVENTION

"Polymer" is used to designate a copolymer prepared using at least two different monomers, with at least one monomer A (cationic or anionic) and at least one non-ionic monomer B and a structuring system comprising at least one compound I and at least one compound II. Optionally, it may comprise at least one zwitterionic monomer and/or one hydrophobic monomer and/or a cross-linking agent and/or a transfer agent.

Water-soluble polymer means a polymer that yields an aqueous solution without insoluble particles when it is dissolved under stirring at 25° C. and with a concentration of $10\ g \cdot l^{-1}$ in deionized water.

In the present invention, the first and second gradient polymers are prepolymers.

In the entire specification, viscosities are measured with a Brookfield viscometer, at 25° C. in aqueous solution.

In this specification, it is considered that the person skilled in the art is able to determine the Brookfield viscometer module and speed suitable according to the viscosity range to be measured. Indeed, this type of measurement is part of the general knowledge of the person skilled in the art.

"X and/or Y", according to the invention, designates "X", or "Y", or "X and Y".

All possible combinations between the different disclosed embodiments, whether these are preferred embodiments or embodiments given as example, are also part of the invention. In addition, when ranges of values are given, the endpoint values are included in these ranges. The disclosure also includes all combinations between the endpoint values and these values ranges. For example, the ranges of values "1-20, preferably 5-15" include the disclosure of the "1-5", "1-15", "5-20" and "15-20" ranges, and the values 1, 5, 15 and 20.

Hereinafter, the water-soluble base polymer obtained according to the method of the invention before it has undergone the reaction with the dialdehyde (advantageously glyoxal) according to step g), is called the base polymer.

Water-Soluble Dialdehyde-Functionalized Polymer (Advantageously, Glyoxalated)

This invention relates to a water-soluble dialdehyde-functionalized polymer (advantageously glyoxalated) characterized by the obtention method thereof.

The water-soluble dialdehyde-functionalized polymer (advantageously glyoxalated) according to the invention comprises (is advantageously constituted of):
at least one monomer A: cationic or anionic;
at least one monomer B: non-ionic;
at least one structuring system comprising:
(i) at least one compound I, different from the at least one monomer A, selected from: allylsulfonic acid, methallylsulfonic acid, allyldisulfonic acid, methallyldisulfonic acid, salts and mixtures thereof;
(ii) at least one compound II of formula (1), different from the at least one monomer B:

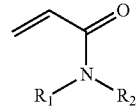

Formula (1)

$R_1$ and $R_2$ being independently of one another, a hydrogen atom, a methyl group, an ethyl group, an isopropyl group or a $CH_2$—OH group;
wherein $R_1$ and $R_2$ are not both a hydrogen atom ($R_1 \neq H$ when $R_2 = H$; $R_2 \neq H$ when $R_1 = H$);
at least one dialdehyde, advantageously glyoxal,
optionally, at least once monomer C: zwitterionic or hydrophobic, optionally, at least one cross-linking agent,
optionally, at least one transfer agent.

Monomer A is only cationic or only anionic. This is not a mixture of cationic and anionic monomers.

When monomer A is anionic, the water-soluble dialdehyde-functionalized polymer does not comprise a cationic monomer.

When monomer A is cationic, the water-soluble dialdehyde-functionalized polymer does not comprise an anionic monomer, with the exception of compound I.

Monomeric Composition

Monomer A

The water-soluble dialdehyde-functionalized polymer (advantageously glyoxalated) according to the invention is a synthetic polymer. It may comprise one or more cationic monomers, or one or more anionic monomers (designated "monomer(s) A").

Advantageously the cationic monomer(s) A may be selected, in particular, from vinylic-type monomers, preferably from acrylamide, acrylic, allylic or maleic, having an ammonium function, advantageously quaternary ammonium. In particular, in a non-limiting way, the following can be cited: quaternized dimethylaminoethyl acrylate (DMAEA), dimethylaminoethyl methacrylate (DMAEMA), diallyldimethylammonium chloride, (DADMAC), acrylamido propyltrimethyl ammonium chloride (APTAC), and methacrylamido propyltrimethyl ammonium chloride (MAPTAC) and mixtures thereof. Preferably, it is diallyldimethylammonium chloride (DADMAC).

The water-soluble dialdehyde-functionalized polymer (advantageously glyoxalated) advantageously comprises between 1 and 60 mol % of cationic monomer(s) A, preferably between 3 and 40 mol %, more preferably between 4 and 30 mol %; the remaining monomer(s) constituting the water-soluble dialdehyde-functionalized polymer to reach 100 mol % are chosen from monomer B and/or monomer C, preferably from monomer B.

The person skilled in the art knows how to prepare quaternized monomers, for example by means of alkyl halide of type R—X, R being an alkyl group (advantageously in $C_1$-$C_3$) and X being a halogen (R—X may be in particular methyl chloride). In addition, this invention also covers DADMAC, APTAC and MAPTAC type monomers which halide counter-ion is fluoride, bromide or iodide instead of chloride.

Advantageously the anionic monomer(s) A may be selected from a large group. These monomers may have a vinylic function, in particular acrylic, maleic, fumaric, malonic, itaconic or allylic. They may also contain a carboxylate, phosphonate, phosphate, sulfonate or another group with anionic charge. Preferred monomers belonging to this class are, for example, acrylic acid, methacrylic acid, itaconic acid, crotonic acid, maleic acid, fumaric acid, acrylamido undecanoic acid, 3-acrylamido 3-methylbutanoic acid, maleic anhydride, 2-acrylamido-2-methylpropane sulfonic acid (ATBS), vinylsulfonic acid, vinylphosphonic acid, 2-sulfoethylmethacrylate, sulfopropylmethacrylate, sulfopropylacrylate, allylphosphonic acid, sulfonic styrene acid, 2-acrylamido-2-disulfonic methylpropane acid, salts and mixtures thereof. Preferably, it is acrylic acid or itaconic acid, even more preferably, acrylic acid.

Thus, in a particular embodiment of the invention, the anionic monomer(s) may be salified.

Salified means that the substitution of a proton of at least one acid function of the type —R(O)—OH (with R=P, S or C) of the anionic monomer A is replaced by a metal cation to form a salt of the type —R(O)—OX (with X is a metal cation). In other words, the non-salified form corresponds to the acid form of the monomer, for example R—C(=O)—OH in the case of the carboxylic acid function, whereas the salified form of the monomer corresponds to the R—C(=O)—O—X+ form, X+ corresponding to an alkali cation. The salification of the acid functions of the water-soluble dialdehyde-functionalized polymer can be partial or total.

The salified form advantageously corresponds to alkali metal salts (Li, Na, K . . . ), to alkaline earth metal salts (Ca, Mg . . . ) or to ammonium salts (for example, the ammonium ion or a tertiary ammonium). The preferred salts are sodium salts.

The salification can be carried out before or after the polymerization.

The water-soluble dialdehyde-functionalized anionic polymer (advantageously glyoxalated) advantageously comprises between 1 and 99 mol % of anionic monomer(s) A, preferably between 2 and 70 mol %, more preferably between 3 and 50 mol % and even more preferably between 5 and 35 mol %. The remaining monomer(s) constituting the water-soluble dialdehyde-functionalized polymer to reach 100 mol % are chosen from monomer B and/or monomer C, preferably from monomer B.

In a particular embodiment of the invention, when the anionic monomer A is 2-acrylamido-2-methylpropane sulfonic acid (ATBS), it is the hydrated form thereof. The hydrated form is a particular form of ATBS which can be obtained by controlled crystallization of the ATBS monomer. Document U.S. Pat. No. 10,759,746 describes this hydrated form of ATBS.

In a preferred embodiment according to the invention, monomer A is preferably a cationic monomer.

Monomer B

The water-soluble dialdehyde-functionalized polymer (advantageously glyoxalated) may comprise one or more non-ionic monomers (referred to as "monomer(s) B").

Advantageously the non-ionic monomers B may be selected, in particular, from the group comprising the water-soluble vinylic monomers. Preferred monomers belonging to this class are, for example, acrylamide, acrylonitrile, methacrylamide and mixtures thereof. Preferably, this is acrylamide.

The water-soluble dialdehyde-functionalized polymer (advantageously glyoxalated) advantageously comprises between 40 and 99 mol % of non-ionic monomers B, preferably between 30 and 98 mol %, more preferably between 60 and 97 mol %, and even more preferably between 70 and 96 mol %.

Monomer C

The water-soluble dialdehyde-functionalized polymer (advantageously glyoxalated) may comprise one or more zwitterionic monomers, or hydrophobic monomers (referred to as "monomer(s) C").

A zwitterionic monomer is an ionic monomer with a zero overall charge. Indeed, a zwitterionic monomer has an identical cationic charge number and anionic charge number.

Advantageously the zwitterionic monomer(s) that can be used in the context of the invention can be selected, notably from the derivatives of a vinyl type motif, notably acrylamide, acrylic, allylic or maleic. Preferably, this monomer comprises an amine or quaternary ammonium function and a carboxylic (or carboxylate), a sulfonic (or sulfonate) or a phosphoric (or phosphate) acid-type function. The zwitterionic monomer(s) may be selected from: dimethylaminoethyl acrylate derivatives, such as, 2-((2-9 (acryloyloxy)ethyl) dimethylammonio) ethane-1-sulfonate, may be in particular mentioned but are not limitative, 3-((2-(acryloyloxy)ethyl) dimethylammonio) propane-1-sulfonate, 4-((2-(acryloyloxy)ethyl)dimethylammonio) butane-1-sulfonate, [2-(acryloyloxy)ethyl](dimethylammonio)acetate, derivatives of dimethylaminoethyl methacrylate such as 2-((2-(methacryloyloxy)ethyl)dimethylammonio) ethane-1-sulfonate, 3-((2-(methacryloyloxy)ethyl) dimethylammonio) propane-1-sulfonate, 4-((2-(methacryloyloxy)ethyl) dimethylammonio) butane-1-sulfonate, [2-(methacryloyloxy)ethyl](dimethylammonio)acetate, derivatives of epropylacrylamide diméthylamino such as 2-((3-acrylamidopropyl)dimethylammonio) ethane-1-sulfonate, 3-((3-acrylamidopropyl)dimethylammonio) propane-1-sulfonate, 4-((3-acrylamidopropyl)dimethylammonio) butane-1-sulfonate, [3-(acryloyl)oxy) propyl](dimethylammonio)acetate, dimethylamino propyl methylacrylamide, or even derivatives such as 2-((3-methacrylamidopropyl)dimethylammonio) ethane-1-sulfonate, le 3-((3-me dimethylammonio) propane-1-sulfonate 4-((3-methacrylamidopropyl) dimethylammonio) butane-1-sulfonate and propyl [3-(methacryloyloxy)](dimethylammonio)acetate and mixtures thereof.

Other zwitterionic monomers are described by the Applicant in document WO2021123599.

The water-soluble dialdehyde-functionalized polymer according to the invention advantageously comprises between 0.001 and 30 mol % of zwitterionic monomers, preferably between 0.01 and 20 mol %, more preferably between 0.1 and 15 mol %.

Advantageously the hydrophobic monomer(s) C may be selected from the groups consisting of esters of (meth) acrylic acid having a $C_4$-$C_{30}$ alkyl chain, arylalkyl (alkyl in $C_4$-$C_{30}$, aryl in $C_4$-$C_{30}$), propoxylated, ethoxylated, or ethoxylated and propoxylated; derivatives of (meth)acrylamide presenting an alkyl chain in $C_1$-$C_3$, propoxylated arylalkyl (alkyl in $C_4$-$C_{30}$, aryl in $C_4$-$C_{30}$), ethoxylated, ethoxylated and propoxylated, or dialkyl (alkyl in $C_4$-$C_{30}$); alkyl aryl sulfonates (alkyl in $C_4$-$C_{30}$, aryl in $C_4$-$C_{30}$), or by mono- or di-substituted amides of (meth)acrylamide presenting an alkyl chain in $C_4$-$C_{30}$, arylalkyl (alkyl in $C_4$-$C_{30}$, aryl in $C_4$-$C_{30}$), propoxylated, ethoxylated, or ethoxylated and propoxylated; derivatives of (meth)acrylamide presenting an alkyl chain in $C_4$-$C_{30}$, arylalkyl propoxylated (alkyl in $C_4$-$C_{30}$, aryl in $C_4$-$C_{30}$), ethoxylated, ethoxylated and propoxylated, or dialkyl in $C_4$-$C_{30}$; alkyl aryl sulfonates (alkyl in $C_4$-$C_{30}$, aryl in $C_4$-$C_{30}$) and mixtures thereof.

The water-soluble dialdehyde-functionalized polymer (advantageously glyoxalated) generally comprises less than 1 mol % of hydrophobic monomers C. It can be free of hydrophobic monomer C.

When the water-soluble dialdehyde-functionalized polymer (advantageously glyoxalated) according to the invention comprises one or more hydrophobic monomers C, they are present in such a quantity that the polymer remains water-soluble.

The quantities of the different monomers will be adjusted by the person skilled in the art so as not to exceed 100 mol % during the preparation of the water-soluble dialdehyde-functionalized polymer (advantageously glyoxalated). Preferably, the monomers A and B represent 100 mol % of the monomers of water-soluble dialdehyde-functionalized polymer (advantageously glyoxalated).

Structuring System

The structuring system of the water-soluble dialdehyde-functionalized polymer (advantageously glyoxalated) comprises:

(i) at least one compound I;
(ii) at least one compound II.

The compound I is selected from: allylsulfonic acid, methallylsulfonic acid, disulfonic ally acid, disulfonic methallyl acid, salts and mixtures thereof. Preferably, this is methallylsulfonic acid, for example, sodium metallylsulfonate.

The salified form advantageously corresponds to the alkali metal salts (Li, Na, K . . . ), to alkaline earth metal salts (Ca, Mg . . . ) or to ammonium salts (for example, the ammonium ion or a tertiary ammonium). The preferred salts are the sodium salts.

The water-soluble dialdehyde-functionalized polymer advantageously comprises between 500 and 50,000 ppm of compound I based on to the total weight of the monomers A and B (+optionally monomer C) of the water-soluble dialdehyde-functionalized polymer, preferably between 1,000 and 20,000 ppm, more preferably between 2,000 and 10,000 ppm.

The compound II used in the context of the invention is of formula (1):

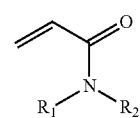

Formula (1)

$R_1$ and $R_2$ being, independently of one another, a hydrogen atom, a methyl group, an ethyl group, an isopropyl group or a $CH_2$—OH group; $R_1$ and $R_2$ not both being a hydrogen atom ($R_1 \neq H$ when $R_2 = H$; $R_2 \neq H$ when $R_1 = H$).

The compound II is advantageously selected from: N,N-dimethylacrylamide, N,N-diethylacrylamide, N,N-isopropylacrylamide, N-methylolacrylamide and the mixtures thereof. Preferably, it is N,N-dimethylacrylamide.

The water-soluble dialdehyde-functionalized polymer according to the invention advantageously comprises between 500 and 50,000 ppm of compound II based on to the total weight of monomers A and B (+optionally monomer C) of the water-soluble dialdehyde-functionalized polymer, preferably between 1,000 and 20,000 ppm, more preferably between 2,000 and 10,000 ppm.

In the water-soluble dialdehyde-functionalized polymer (advantageously glyoxalated), the mass ratio between compound I and compound II is advantageously comprised between 0.01 and 100, preferably between 0.1 and 10.

In a preferred embodiment according to the invention, the quantity of compound I is greater than the quantity of compound II. Thus, the mass ratio between compound I and compound II is advantageously greater than 1 and less than or equal to 100, preferably greater than 1 and less than or equal to 10.

Optional

The water-soluble dialdehyde-functionalized polymer (advantageously glyoxalated) may further comprise at least one crosslinker. This crosslinker can be selected from polyethylene unsaturated monomers (having a minimum of two unsaturated functions), such as, for example, vinylic functions, notably allylic, acrylic, or from the monomers having at least two epoxy functions. For example, methylene bis acrylamide (MBA), triallylamine, tetraalkylammonium chloride, 1,2 dihydroxyethylene bis-(N-acrylamide) and mixtures thereof can be cited. Preferably, it is methylene bis acrylamide, (MBA).

The quantity of crosslinker in the water-soluble dialdehyde-functionalized polymer is advantageously comprised between 5 and 5,000 ppm, based on to the total weight of monomers A and B (+optionally, monomer C) of the water-soluble dialdehyde-functionalized polymer, more preferably between 50 and 3,000 ppm.

In a particular embodiment according to the invention, the water-soluble dialdehyde-functionalized polymer (advantageously glyoxalated) does not comprise a crosslinker.

The water-soluble dialdehyde-functionalized polymer (advantageously glyoxalated) according to the invention may also comprise at least one transfer agent, for example, selected from methanol, isopropyl alcohol, sodium hypophosphite, 2-mercaptoethanol and mixtures thereof. Other transfer agents include xanthate, dithiocarbonate, dithiocarbamate and trithiocarbonate types, and mixtures thereof, preferably it is sodium hypophosphite.

The quantity of transfer agent in the water-soluble dialdehyde-functionalized polymer is advantageously comprised between 10 and 10,000 ppm, based on to the total weight of monomers A and B (+optionally, monomer C) of the water-soluble dialdehyde-functionalized polymer, more preferably between 50 and 5,000 ppm.

In a particular embodiment according to the invention, the water-soluble dialdehyde-functionalized polymer (advantageously glyoxalated) does not comprise a transfer agent.

Physical Properties of the Base Polymer

The base polymer has a weight average molecular weight advantageously comprised between 1,000,000 and 25,000,000 daltons, preferably between 2,000,000 and 15,000,000 daltons, more preferably between 2,000,000 and 10,000,000 daltons, for instance between 3,000,000 and 10,000,000 daltons. This is the weight average molecular weight.

The weight average molecular weight is preferably measured by gel permeation chromatography coupled to a Malls detector.

The base polymer is advantageously obtained and used in liquid form.

The viscosity of the solution comprising the base polymer is advantageously comprised between 1,000 and 50,000 cps, preferably between 2,000 and 20,000 cps, for instance between 5,000 and 20,000 cps.

Renewable Origin

In a preferred embodiment according to the invention, the water-soluble dialdehyde-functionalized polymer (advantageously glyoxalated) is prepared using monomers of at least partially renewable and non-fossil origin.

In the context of the invention, the terms "of renewable and non-fossil origin" designate the origin of a chemical compound issuing from biomass or synthetic gas (syngas), namely, one that is the result of one or more chemical transformations performed on one or more raw materials of natural, and non-fossil, origin. The terms "bio-sourced" or "bio-resourced" can also be used to characterize the renewable and non-fossil origin of a chemical compound. The renewable and non-fossil origin of a compound includes renewable and non-fossil raw materials coming from the circular economy, and which have been previously recycled, one or more times, during a recycling process of material coming from biomass, such as, for example, material coming from polymer depolymerization or from the transformation of pyrolysis oil.

According to the invention, "at least partially of renewable and non-fossil origin" means a content of bio-sourced carbon comprised between 5% by weight and 100% by weight based on to the total carbon weight of said compound, preferably at least 30%, more preferably at least 50%, even more preferably at least 70%, more preferably at least 90% and even more preferably, at least 100% bio-sourced carbon.

In the context of the invention, the standard ASTM D6866-21, method B, is used to characterize the bio-sourced nature of a chemical compound, and to determine the bio-sourced content of said compound. The value is expressed in percent by weight of bio-sourced carbon based on to the total weight of carbon in said compound.

Gradient

The base polymer and the water-soluble dialdehyde-functionalized polymer (advantageously glyoxalated) according to the invention are gradient polymers.

Polymers with a gradient structure are polymers composed of at least two monomers in which the change in monomer composition is gradual, unlike the block polymers, which undergo an abrupt change in composition, and unlike random polymers, which do not have a continuous change in composition. In the gradient polymer, due to the gradual change in composition over the length of the polymer chain, less inter-chain and intra-chain repulsion is observed.

The gradient can be formed by a spontaneous or forced gradient. Spontaneous gradient polymerization is due to a difference in the monomer reactivity. Forced gradient polymerization involves varying the monomer composition introduced throughout the polymerization time.

A forced method comprises (1) the introduction of a first fraction of monomers into a reactor, (2) the addition of at least one additional monomer fraction advantageously different from the first and (3) the polymerization of the monomers introduced into the reactor. The polymerization of the monomers is initiated with the introduction of the first fraction.

The addition of the additional monomer fraction may be done in parallel with the introduction of the first fraction of monomers into the reactor (the introduction of fractions can, therefore, begin and end at the same time). Alternatively, the beginning of the first monomer feed (first fraction) into the reactor may precede the beginning of the addition of a second monomer fraction. Alternatively, a first and a second fraction can be introduced simultaneously, but the time taken to add the second fraction can be longer than the time taken to add the first fraction into the reactor. This embodiment is also applicable to methods with at least 3 monomer fractions.

According to the method of the invention, the water-soluble dialdehyde-functionalized polymer (advantageously glyoxalated) obtained is formed by the sequential addition of monomers, that is, it is preferably a forced gradient.

The method according to the invention comprises a first fraction (F1) and at least two additional fractions (F2 and F3). At least one of fractions F1, F2 and F3 of the method is different from the other fractions. Preferably, fractions F1, F2 and F3 are different. By different fraction, we mean a fraction composed of different monomers (ratio and/or nature of the monomers) and/or of compounds I and II (ratio and/or nature of compounds I and II).

Polymerization Method

The sequential polymerization method of the water-soluble dialdehyde-functionalized polymer (advantageously glyoxalated) comprises the following steps:

a) formation of a solution (S1) comprising at least a first fraction (F1) containing (1) at least one monomer selected from monomers A and B and (2) at least one compound selected from compounds I and II;

b) polymerization 1 (PO1) of the fraction F1 to form a solution of a first gradient polymer (PG1);

c) addition to the solution comprising PG1, of a second fraction (F2) containing (1) at least one monomer selected from monomers A and B and (2) at least one compound selected from compounds I and II;

d) polymerization 2 (PO2) of the fraction F2 on PG1 in order to form a solution of a second gradient polymer (PG2);

e) addition, to the solution comprising PG2 of a third fraction (F3) containing (1) at least one monomer selected from monomers A and B and (2) at least one compound selected from compounds I and II;

f) polymerization 3 (PO3) of the fraction F3 on PG2, in order to form a solution comprising a base polymer;

g) dilution of the solution comprising the base polymer and reaction between the at least one dialdehyde (advantageously the glyoxal) and the base polymer to obtain a water-soluble dialdehyde-functionalized polymer (advantageously glyoxalated)

and at least one of the fractions F1, F2 or F3 contains at least one monomer A, at least one of the fractions F1, F2 or F3 contains at least one monomer B, at least one of the fractions F1, F2 or F3 contains at least one compound I and at least one of the fractions F1, F2 or F3 contains at least one compound II.

This method may comprise the addition of additional fractions, but none after step g) of dialdehyde reaction.

It is possible that the improved performances of polymers obtained according to the method of the invention may be due to the fact that the polymerization is carried out in sequentially and continuously, that is, without interruption.

By "sequentially", we mean that the polymerization of the monomers of the base polymer occurs in multiple fractions, without also not being interrupted, i.e., fractions are added continuously and the polymerization does not stop. The different steps a) to f) are carried out sequentially. In other words, a first fraction of monomers can be poured (in a flow form) and polymerizes to form a first gradient polymer PG1 which continues to polymerize with the fraction F2 to form the gradient polymer PG2 which itself continues to polymerize with the fraction F3 in order to obtain, at the end of polymerization, the base polymer. At least one of fractions F1, F2 and F3 is different from the other fractions. Preferably, fractions F1, F2 and F3 are different. The addition of different fractions during the polymerization method allows obtaining a gradient in the base polymer composition.

In a particular embodiment, the polymerization can be stopped after PO1 and/or PO2 and continued in a different localization. In this embodiment, the fraction $F_{X+1}$ (X=1 or 2) added to the gradient polymer $PG_X$ formed during the previous step(s), polymerizes and interacts with $PG_X$ to form $PG_{X+1}$ and the process continues at the following step to eventually obtain the base polymer. Step g) is carried out on the base polymer once the polymerization is complete, consecutively to the end of polymerization or at another time (later). Preferably, it is carried out consecutively. In other words, the base polymer used for step g) no longer continues to polymerize. However, it undergoes a post-treatment which modifies its chemical structure. Step g) is advantageously carried out in a different reactor from the polymerization as it requires the dilution of the solution comprising the base polymer. The dilution of the base polymer is advantageously carried out in water.

In the polymerization method according to the invention, the total sum of molar percentages of the monomers of the different fractions is equal to the total sum of the molar percentages of the monomers of the water-soluble dialdehyde-functionalized polymer (advantageously glyoxalated).

Step a), Formation of a Solution (S1) Comprising a First Fraction (F1)

Solution (S1)

The solution S1 is typically composed of:
a solvent;
an initiator;
a first fraction F1.

The solvent is advantageously water, or a solvent in which the monomers and the base polymer are soluble. Preferably, the solvent is water.

The polymerization initiators used can be any compounds that dissociate into radicals under polymerization conditions, for example: organic peroxides, hydroperoxides, hydrogen peroxide, persulfates, azo compounds and redox pairs. The use of water-soluble initiators is preferred. In some cases, it is advantageous to use mixtures of various polymerization initiators, for example, mixtures of redox catalysts and of azo compounds. Preferably, they are persulfates.

In one particular embodiment, the solution S1 is formed by mixing the solvent, the initiator and fraction F1 in a polymerization tank.

In this particular embodiment, fraction F1 may be added at once, in several additions or poured (in a flow form), i.e., progressively and continuously (for example dropwise) to the solvent/initiator mixture. Preferably, fraction F1 is added at once in the polymerization tank.

In a particular embodiment of the invention, the initiator and fraction F1 are poured (in a flow form) to a polymerization tank comprising the solvent. They can be added separately, or mixed beforehand. Preferably, they are added separately.

In a preferred embodiment of the invention, the initiator is added continuously throughout the polymerization process. In this case, the initiator is advantageously added in parallel with the different fractions, during the different polymerization steps and during the possible aging steps of the different gradient polymers (PG1 and PG2) and of the base polymer.

In this preferred embodiment of the invention, the duration of the initiator pouring is comprised between 50 minutes and 560 minutes, preferably between 130 minutes and 430 minutes.

First Fraction (F1)

Advantageously fraction F1 comprises between 10 and 45% by weight of monomer (A and/or B, +optionally C) based on to the total weight of monomer (A+B+optionally C) of the water-soluble dialdehyde-functionalized polymer, preferably between 15 and 40% by weight.

Fraction F1 advantageously comprises between 0 and 65 mol % of monomers A (advantageously cationic), preferably between 5 and 55 mol %, based on to the total number of moles of monomers in fraction F1.

Fraction F1 advantageously comprises between 35 and 100 mol % of non-ionic monomers B, preferably between 45 and 95%, based on to the total number of moles of monomers in fraction F1.

Fraction F1 advantageously comprises between 250 and 30,000 ppm of compound I based on the total weight of monomers A and B (+optionally monomer C) of the water-soluble dialdehyde-functionalized polymer (advantageously glyoxalated), preferably between 500 and 10,000 ppm, more preferably between 1,000 and 7,000 ppm.

Fraction F1 advantageously comprises between 250 and 30,000 ppm of compound II based on to the total weight of monomers A and B (+optionally monomer C) of the water-soluble dialdehyde-functionalized polymer (advantageously glyoxalated), preferably between 500 and 10,000 ppm, more preferably between 1,000 and 5,000 ppm.

The different monomers and compounds included in fraction F1 are advantageously added in the form of solutions. These solutions can be added separately or in mixture to the polymer tank, at once, in several additions or poured (in a flow form), i.e., dropwise, in order to form the solution S1. Preferably, the addition is made as a mixture and at once.

When fraction F1 is poured (in a flow form), the pouring advantageously lasts between 10 minutes and 80 minutes, preferably between 40 minutes and 70 minutes.

In a preferred embodiment, fraction F1 is prepared in the reactor (polymerization tank) before the addition of initiator.

In a preferred embodiment, fraction F1 contains at least one monomer A, at least one monomer B, at least one compound I and at least one compound II.

Step b), Polymerization of Fraction F1 to Form a First Gradient Polymer (PG1)
Polymerization 1 (PO1)

Prior to polymerization PO1, the atmosphere in the polymerization tank can be replaced by an inert gas such as, for example, nitrogen or argon.

Polymerization PO1 is generally a radical polymerization. Polymerization initiators can be used, in particular initiators that dissociate into radicals under polymerization conditions.

Polymerization PO1 is generally initiated at a temperature comprised between 7° and 90° C., preferably between 75 and 85° C., the polymerization temperature is then controlled using cooling means so as not to exceed 95° C.

Polymerization PO1 typically lasts between 10 and 80 minutes, preferably, between 40 minutes and 70 minutes.

Advantageously polymerization advantageously starts when the first monomers, the solvent and the initiator are in contact, in other words, the duration of polymerization PO1 advantageously corresponds to the duration of the pouring of fraction F1.

Gradient Polymer (PG1)

At the end of the polymerization PO1, a gradient polymer (PG1) is obtained.

In a particular embodiment according to the invention, the gradient polymer PG1 is left to age between 5 minutes and 60 minutes, preferably between 10 minutes and 30 minutes.

"left to age" means that the temperature of the medium is maintained between 8° and 90° C. after the end of the polymerization in order to enable an increase in viscosity through polymer internal branching phenomena. This definition of aging applies to all the steps of the polymerization method.

Step c) Addition of a Second Fraction (F2) to the Solution Comprising PG1
Second Fraction F2

Advantageously fraction F2 comprises between 30 and 80% by weight of monomer (A and/or B, +optionally C) based on to the total weight of monomer (A+B, +optionally C) of the water-soluble dialdehyde-functionalized polymer (advantageously glyoxalated), preferably between 40 and 70% weight.

Fraction F2 advantageously comprises between 0 and 50 mol % of monomers A (advantageously cationic), preferably between 0 and 40 mol %, based on to the total number of moles of monomers in fraction F2.

Fraction F2 advantageously comprises between 0 and 100 mol % of non-ionic monomers B, preferably between 60 and 100 mol %, based on to the total number of moles of monomers in fraction F2.

Fraction F2 advantageously comprises between 250 and 30,000 ppm of compound I based on to the total weight of A and monomers A and B (+optionally monomer C) of the water-soluble dialdehyde-functionalized polymer (advantageously glyoxalated), preferably between 500 and 10,000 ppm, more preferably between 1,000 and 5,000 ppm.

Fraction F2 advantageously comprises between 250 and 30,000 ppm of compound II in relation to the total weight of A and B monomers (+optionally, C monomer) of the water-soluble dialdehyde-functionalized polymer (advantageously glyoxalated), preferably between 500 and 10,000 ppm, more preferably between 1,000 and 5,000 ppm.

The different monomers and compounds included in fraction F2 are advantageously added in the form of solutions. These solutions can be added separately or in mixture into the polymer tank, at once, in several additions or poured (in a flow form). Preferably, the addition is made as a mixture and poured (in a flow form).

When fraction F2 is poured (in a flow form), the pouring advantageously lasts between 10 minutes and 100 minutes, preferably between 30 minutes and 90 minutes.

The addition of the fraction F2 in a flow form (for example dropwise) allows controlling the exothermicity of the reaction that may otherwise be too high even when using a cooler.

In a preferred embodiment, fraction F2 contains at least one monomer A, at least one monomer B, at least one compound I and at least one compound II.

Step d), Polymerization of Fraction F2 on PG1 to Form a Second Gradient Polymer (PG2)
Polymerization (PO2)

Polymerization PO2 is carried out as a continuation of the polymerization PO1; it is performed under the same time and temperature conditions (advantageously 70 to 90° C.).

Polymerization PO2 advantageously lasts between 10 minutes and 100 minutes, preferably between 30 and 90 minutes.

Polymerization PO2 starts with the addition of the first monomers of fraction F2.

Advantageously the duration of polymerization PO2 corresponds to the duration of the pouring of fraction F2.
Gradient Polymer (PG2)

At the end of polymerization PO2, a gradient polymer (PG2) is obtained.

In a particular embodiment of the invention, the gradient polymer PG2 is left to age between 5 minutes and 60 min, preferably between 10 minutes and 30 min.

Step e) Addition of a Third Fraction (F3) to the Solution Comprising PG2
Fraction F3

Advantageously fraction F3 comprises between 5 and 40% by weight of monomer (A and/or B, +optionally C) based on to the total weight of monomer (A+B+optionally C) of the water-soluble dialdehyde-functionalized polymer (advantageously glyoxalated), preferably between 10 and 30% by weight.

Fraction F3 advantageously comprises between 0 and 50 mol % of monomers A (advantageously cationic), preferably between 0 and 35 mol %, based on to the total number of moles of monomers in fraction F3.

Fraction F3 advantageously comprises between 50 and 100 mol % of non-ionic monomers B, preferably between 65 and 100 mol %, based on to the total number of moles of monomers in fraction F3.

Fraction F3 advantageously comprises between 0 and 10,000 ppm of compound I based on to the total weight of monomers A and B (+optionally monomer C) of the water-soluble dialdehyde-functionalized polymer (advantageously glyoxalated), preferably between 10 and 5000 ppm, more preferably between 20 and 1,000 ppm.

Fraction F3 advantageously comprises between 0 and 10,000 ppm of compound II based on to the total weight of monomers A and B (+optionally monomer C) of the water-soluble dialdehyde-functionalized polymer (advantageously glyoxalated), preferably between 0 and 1,000 ppm.

The different monomers and compounds included in fraction F3 are advantageously added in the form of solutions. These solutions can be added separately or in mixture into the polymer tank, at once, in several additions or poured (in a flow form), i.e. dropwise. Preferably, the addition is made in mixture and poured (in a flow form).

When fraction F3 is poured (in a flow form), the pouring lasts, advantageously between 10 minutes and 100 minutes, preferably between 30 minutes and 90 minutes.

The addition of the fraction F3 in a flow form (for example dropwise) allows controlling the exothermicity of the reaction that may otherwise be too high even when using a cooler.

In a preferred embodiment, fraction F3 contains at least one monomer B and at least one compound I.

In an embodiment, the amount of compound I in fraction F3 is less than 500 ppm, preferably less than 300 ppm, preferably less than 200 ppm and even more preferably less than 100 ppm.

Such a small amount enables reaching the desired physical and unique properties of the base polymer and subsequently of the final water-soluble dialdehyde-functionalized polymer.

Step f), Polymerization of Fraction F3 on PG2 to Form a Water-Soluble Dialdehyde-Functionalized Polymer Polymerization (PO3)

Polymerization PO3 is performed as a continuation of the polymerization PO2; it is performed under the same time and temperature conditions as PO2 (advantageously 70 to 90° C. for 10 to 100 minutes, preferably between 30 and 90 minutes).

Polymerization PO3 starts with the addition of the first monomers of fraction F3.

Advantageously the duration of polymerization PO3 corresponds to the duration of the pouring of fraction F3.

At the end of polymerization PO3, the base polymer is obtained.

In a particular embodiment according to the invention, the base polymer is left to age between 5 minutes and 60 minutes, preferably between 10 minutes and 30 minutes, before the elimination of the residual monomers.

The reaction is stopped by the addition of an excess of initiator and/or of water; this step is used to eliminate the possible residual monomers present in the solution comprising the base polymer.

Optional Steps

The method according to the invention can also comprise additional steps and is not limited to the steps described above.

In a particular embodiment of the invention, the polymerization method according to the invention can comprise the addition of additional fractions constituting the base polymer.

In a preferred embodiment of the invention, the base polymer is left to age between 10 minutes and 100 minutes after step f) of polymerization PO3 and prior to step g), preferably between 30 minutes and 90 minutes. In the case of the addition of supplementary fractions, the aging is carried out after the last polymerization step and before step g).

In a particular embodiment of the invention, a crosslinker and/or transfer agent is added during at least one of the steps described above.

In a particular embodiment of the invention, the crosslinker is added in fraction F1 and/or in fraction F2.

When a crosslinker is added, it is advantageously selected from the crosslinkers cited above.

When a crosslinker is added, the quantity thereof is advantageously between 5 and 5,000 ppm based on to the total weight of the water-soluble dialdehyde-functionalized polymer (advantageously glyoxalated) (monomers A, B and optionally C), preferably between 50 and 3,000 ppm.

In a particular embodiment of the invention, the transfer agent is added in fraction F1 and/or in fraction F2.

When a transfer agent is added, it is advantageously selected from the transfer agents cited above.

When a transfer agent is added, the quantity thereof is advantageously comprised between 10 and 10,000 ppm based on to the total weight of the water-soluble dialdehyde-functionalized polymer (advantageously glyoxalated) (monomers A, B and optionally C), preferably between 50 and 5,000 ppm.

Step g), Dialdehydation (Advantageously Glyoxalation) of the Base Polymer

Advantageously the dialdehyde-functionalization reaction (advantageously glyoxalation) comprises at least the following successive steps:

g1) dilution (advantageously in water) of the solution comprising the base polymer, in order to form a diluted solution of the base polymer (SD1);

g2) optionally adjustment of the pH of SD1 to at least 10;

g3) addition of at least one dialdehyde to the solution obtained in step g1) or g2), to form a diluted solution (SD2);

g4) optionally acidification to a pH comprised between 2 and 4, preferably between 2.5 and 3.5, of the solution obtained in step g3) in order to form a diluted solution (SD3).

Advantageously at step g1), the amount of base polymer in the diluted solution (SD1) is comprised between 1 and 15% by weight, preferably between 2 and 13%. The dilution is advantageously carried out in water.

Advantageously the dialdehyde, added at step g3), is selected from the group comprising: glyoxal, glutaraldehyde, furane-dialdehyde, adipaldehyde, succinaldehyde, dialdehyde starch, 2,2-dimethoxyacetaldehyde, diepoxy compounds and the mixtures thereof. Preferably, this is glyoxal.

Advantageously the mass concentration in dialdehyde is comprised between 5 and 30% based on to the total weight of monomers A and B (optionally C), preferably between 10 and 25%, more preferably, between 15 and 20%.

Advantageously step g3) is carried out at a temperature comprised between 19 and 26° C. in a reactor under stirring. Preferably, and after g2), the pH at the beginning of the addition of the dialdehyde is maintained to between 10 and 11, for example, with a 10% by weight of a soda solution in water. The reaction between the dialdehyde and the base polymer at step g3) is followed by an increase in the viscosity of the aqueous solution.

In a particular embodiment according to the invention, when g2) is not carried out, the pH is adjusted to at least 8 at the end of step g3), for example, with a 10% by weight soda solution of in water, maintaining the pH through all of step g3).

In a particular embodiment of the invention, the diluted solution (SD2) is directly used and injected into paper pulp.

Step g3) advantageously lasts between 2 minutes and 90 minutes, preferably, between 5 and 75 minutes.

Once the desired viscosity is reached, step g4) may be carried out.

Step g4) is preferably carried out at a temperature comprised between 19 and 26° C. in a reactor, preferably under stirring, by the addition of acid, for example, of concentrated sulfuric acid.

Advantageously the reaction of dialdehydation (advantageously glyoxalation) is monitored via the measure of viscosity, turbidity, delta P . . . etc.

At the end of step g4) or g3), the water-soluble dialdehyde-functionalized polymer (advantageously glyoxalated) is obtained.

In a particular embodiment of the invention, step g) comprises a step g5) comprising the addition of at least one dialdehyde to the solution obtained in step g4).

Advantageously the dialdehyde is selected from the group previously described, preferably, it is the same as in step g3).

In a particular embodiment and advantageously the mass concentration in dialdehyde added at step g3) and g5) is comprised between 5 and 30% based on to the total weight of monomers A and B (optionally C), preferably between 10 and 25%, more preferably, between 15 and 20%.

Advantageously the mass concentration added at step g3) is the same as the mass concentration added at step g5).

In a particular embodiment of the invention, a micro-cellulose compound is reacted with the water-soluble dialdehyde-functionalized polymer (advantageously glyoxalated).

The micro-cellulose/water-soluble dialdehyde-functionalized polymer mixture can then be added as an additive to the paper pulp in place of the water-soluble dialdehyde-functionalized polymer (alone) according to the invention in all of the particular embodiments previously described.

Advantageously the micro-cellulose compound is selected from nano-fibrillated cellulose, micro-fibrillated cellulose, nano-crystalline cellulose, nano cellulose.

Advantageously between 10% and 100% by weight of the micro-cellulose compound are added to the water-soluble dialdehyde-functionalized polymer (advantageously glyoxalated), based on to the weight of the water-soluble dialdehyde-functionalized polymer (advantageously glyoxalated), preferably between 10 and 50%.

Even though it is prepared in solution, the water-soluble dialdehyde-functionalized polymer of the invention can be used in solid form. In practice, the solid form is obtained, among other ways, by methods consisting of drying the solution of step g). The technical principles of solid/liquid isolation are those of drying by atomization or spraying (which consists of creating a cloud of fine droplets in a hot gaseous current for a controlled period of time), of drum drying, fluidized bed dryers.

Papermaking Method

This invention also relates to a paper or cardboard manufacturing method comprising (1) the addition of a water-soluble dialdehyde-functionalized polymer (advantageously glyoxalated) according to the invention to an aqueous suspension of fibers and (2) the formation of a sheet of paper or cardboard. Thus, the invention relates to the use of a water-soluble dialdehyde-functionalized polymer (advantageously glyoxalated) in a papermaking method.

The different steps in a papermaking production method, cardboard or the like are known and comply with techniques that are part of the knowledge of the skilled person in the art, it is not necessary to describe them in further detail, because they remain known and classic of what the person skilled in the art knows. If necessary, they can refer to the document: Handbook for Pulp & Paper Technologists, $4^{th}$ Edition, G. A. Smook.

According to the invention, the water-soluble dialdehyde-functionalized polymer (advantageously glyoxalated) is added in the papermaking process, before or after the formation of the sheet of paper, cardboard or the like. Thus, putting the cellulose material in contact with the polymer of the invention can be done in different ways and in particular according to the typical methods known to the person skilled in the art.

The water-soluble dialdehyde-functionalized polymer (advantageously glyoxalated) can be added to the cellulose material in the form of a diluted or undiluted aqueous solution. It can be applied by an impregnation technique or it can be added directly to the fibrous suspension at any point of the method for producing paper where dry strength agents are usually introduced.

Thus, the polymer according to the invention can be introduced into the thick stock or into the thin stock. It can be added at the mixing pump, before the headbox or filter sieve. Preferably, the polymer is introduced before the headbox.

Preferably, the polymer according to the invention is industrially injected into the fibrous suspension, i.e., before its dilution by the pulp water (thick stock). The consistency of the pulp is on the order of 1 to 5% by weight of the cellulose fibers.

The papermaking method according to the invention can be implemented with any type of paper pulp, such as, for example, virgin fiber pulp (Kraft, Bisulfite), recycled fibers, de-inked pulps, mechanical and thermo-mechanical pulps.

The water-soluble dialdehyde-functionalized polymer (advantageously glyoxalated) is advantageously added before the formation of the sheet, directly into the fibrous suspension.

It can be added at a single injection point, or at two injection points.

The papermaking method according to the invention may also include the addition of other additives and/or polymers, according to needs; by way of example and not as limitations, we can cite: biocides, coagulants, retention agents, flocculants, starch . . . .

Use

The present invention also relates to the use of this water-soluble dialdehyde-functionalized polymer (advantageously glyoxalated) in the recovery of hydrocarbons (oil and/or gas); in the drilling or cementing of wells; in the stimulation of hydrocarbon wells (oil and/or gas), for example, in the hydraulic fracturing, conformance, diversion; in open, closed or semi-closed circuit water processing; in the treatment of fermentation musts; in the treatment of sludges; in construction; in lumber treatment; in the treatment of hydraulic composition (concrete, cement, mortar and aggregates); in the mining industry; in the formulation of cosmetic products; in the formulation of detergents;

in textile manufacturing; in the geothermal sector; in the manufacture of sanitary napkins; or in agriculture.

The present invention also relates to the use of the water-soluble dialdehyde-functionalized polymer (advantageously glyoxalated) as a flocculant, coagulant, binding agent, fixing agent, viscosity-reducing agent, thickening agent, absorption agent, friction-reducing agent, drainage agent, charge-retaining agent, dehydrating agent, conditioning agent, stabilizing agent, fixing agent, film-forming agent, sizing agent, superplasticizer agent, clay inhibitor or dispersant.

The invention and the advantages derived therefrom will be more apparent in the following examples given in order to illustrate the invention, and in a non-limiting manner.

EXAMPLES

List of Abbreviations

DADMAC: Diallyldimethyl ammonium chloride (monomer A)
AMD: Acrylamide (monomer B)
DMAM: Dimethylacrylamide (compound II)
SMS: Methallyl sodium sulfonate (compound I)
SPS: Sodium persulfate (polymerization initiator)
MBA: Methylene bis acrylamide (cross-linking agent)
PEI: Polyethyleneimine Description of the Characterization of the GPC-Malls of the Molecular Weight Gel permeation chromatography is a method that allows separation of the macromolecules according to their hydrodynamic volume; it is coupled to a Malls detector, making it possible to measure the diffusion of the light at multiple angles.

The synthetized polymers are analyzed under the following conditions:

Instrument: GPC-2
Columns: Shodex SB-807-HQ & SB-805 custom
Method:
Temperature: 30° C.
Mobile phase: 0.5M $NaNO_3$, HEPES (pH=8), 100 ppm $NaN_3$
Injection: 100p L
Flow: 0.3 mL/min
Detection:
(i) Light diffusion detector (MALS): Absolute molar mass
(ii) Refractometry (RI): Concentration The viscosity is measured using a Brookfield viscometer, at 25° C., with a Brookfield LVI module, speed 60 rpm.

Preparation of the Polymers 1 to 3 According to the Invention (INV)

Base Polymer 1 (P1)
First Sequence: Gradient Polymer PG1

In a 1-liter reactor equipped with a mechanical stirrer, a thermometer, a condenser and a nitrogen gas dipping rod, a first fraction F1 is introduced in the reactor, comprising 140 g of water, 89.3 g of acrylamide (50% by weight in water), 16.7 g of diallyldimethyl ammonium chloride (64% by weight in water), 1 g of citric acid, 0.5 g of dimethylacrylamide and 0.87 g of methallyl sodium sulfonate. The medium is heated and maintained at a temperature between 79 and 81° C. using a water bath. An addition of 0.05 g of sodium persulfate makes it possible to initiate this starter and to start the polymerization of the monomers (PO1) in order to form a first gradient polymer PG1.

Second Sequence: Gradient Polymer PG2

When the exothermic reaction ends, the pouring starts: an initiator is added (44 g of SPS at 0.33% by weight in water) over 130 minutes and, simultaneously, a second fraction F2, consisting of 24.3 g of water, 178.6 g of acrylamide (50% by weight in water), 16.7 g of DADMAC (64% by weight in water), 0.5 g of dimethylacrylamide and 0.41 g of methallyl sodium sulfonate, over 50 minutes. Once fraction F2 has been poured, the gradient polymer PG2 is allowed to age for 10 minutes (polymerization PO2 to form the gradient polymer PG2 takes place during the pouring of fraction F2 and during aging).

Third sequence: Base Polymer 1 (P1)

Then, the third fraction F3, consisting of 115.6 g of water, 89.3 g of acrylamide (50% by weight in water), 0.01 g of methallyl sodium sulfonate, is poured over 60 minutes. At the end of the addition of fraction F3, the polymer is allowed to age for 10 minutes (polymerization PO3 to form the polymer takes place during the pouring of fraction F3 and during aging).

Once aging is completed, 140 g of water are added, as well as 0.15 g of sodium persulfate. When the desired viscosity is reached, the reaction is stopped by an addition of 0.6 g of sodium bisulfite (40% by weight in water) and 140 g of water. A new aging of 60 minutes is applied before cooling. The solution comprising the base polymer 1 (P1) has a pH of 3.5, an active matter of 20% by weight, a viscosity of 4,100 cps and a molecular weight obtained by GPC-Malls of 4,300,000 Da.

Glyoxalation of the Base Polymer 1 (P1) According to the Invention (P1-A/B (INV))

Polymer 1-A (P1-A)

64 g of base polymer 1 (P1) and 728 g of water are introduced into a 1-liter reactor equipped with a mechanical stirrer. The reactor is equipped with a pH probe. After 10 minutes of stirring, the pH is adjusted to 10.3 with a soda solution of 10% by weight in water. The temperature is maintained between 2° and 22° C. 8 g of glyoxal (40% by weight in water) are added. A check of the pH and a monitoring of the viscosity make it possible to obtain a product of 39 cps after 58 minutes of reaction time. When the desired viscosity is reached, the reaction is stopped by a lowering of the pH to less than 3.5 by the addition of $H_2SO_4$ (92% by weight in water), and polymer 1-A (P1-A) according to the invention is obtained.

Polymer 1-B (P1-B)

The protocol for the preparation of polymer 1-A is reproduced by varying the quantity of glyoxal added, polymer 1-B (P1-B) according to the invention is obtained. The composition is summarized in table 2.

Base Polymers 2 and 3 (P2 and P3)

The protocol for the preparation of polymer 1 is reproduced by varying the composition of the different fractions, in order to make the base polymers 2 (P2) and 3 (P3) according to the invention. The compositions of the different fractions used to obtain these base polymers are summarized in table 1a.

Glyoxalation of Base Polymers 2 and 3 (P2-A/B and P3-A/B) According to the Invention (INV)

The protocol for the preparation of polymer 1-A/B is reproduced by varying the quantity of glyoxal added, in order to obtain polymers 2-A, 2-B, 3-A and 3-B. Their compositions are summarized in table 2.

Preparation of Comparative Examples Polymers 4 to 7 (CE1 to CE4)

Polymer 4 (CE1)

This polymer is prepared in one sequence.

In a 1-liter reactor equipped with a mechanical stirrer, a thermometer, a condenser and a nitrogen gas dipping rod, 526 g of water, 33.1 g of DADMAC (64% by weight in water) are introduced. The pH is adjusted to 2.5 with $H_2SO_4$. The medium is heated and maintained at a temperature between 79 and 81° C. using a water bath. 357.8 g of acrylamide (50% by weight in water) is incorporated by continuous pouring over 90 minutes and a solution of sodium persulfate by pouring for 90 minutes. After 10 minutes of aging, 0.6 g of sodium bisulfite (40% by weight in water) are added to cause possible residual monomers to react. A new aging period of 60 minutes is applied before cooling. The solution comprising base polymer 4 (CE1) obtained has a pH of 5.0, an active matter of 20.1% by weight, a viscosity of 4,100 cps and a molecular weight obtained by GPC-Malls of 429,000 Da.

Glyoxalation of Polymer 6 (CE3-A/B)

The protocol for the preparation of polymer 1-A is reproduced while varying the quantity of glyoxal added. Polymers 6-A (CE3-A) and 6-B (CE3-B) are obtained, their composition is summarized in table 2.

Polymer 7 (CE4-A/B)

The polymer 7 (CE4) is prepared according to the same protocol as for the polymer 1 but in 2 sequences only. The compositions of the different fractions of the polymerization process to prepare the base polymers 1-3 according to the invention (P1 to P3) and the comparative base polymers examples (CE1 to CE4) are summarized in Table 1a.

In this Table 1a, the monomer content, described in each fraction, represents the molar weight percentage of the AMD (or DADMAC) monomer relative to the total molar weight of the corresponding monomer in the total fractions. Thus the sum of the percentages of AMD monomer, for example, in the three fractions equals 100%.

The contents of compounds I (SMS) and II (DMAM) are expressed in ppm by weight based on to the total weight of monomer(s) in the three fractions.

TABLE 1a

Compositions of the polymerization process fraction(s) to obtain the base polymers P1 to P3 according to the invention (P1-P3 (INV)) and comparative examples P4 to P7 (CE1 to CE4).

| | | Amount of the Compounds in F1 (by weight) | | Amount of the Compounds in F2 (by weight) | | Amount of the compounds in F3 (by weight) | |
|---|---|---|---|---|---|---|---|
| P1 (INV) | AMD | 25% | AMD | 50% | AMD | 25% |
| | DADMAC | 50% | DADMAC | 50% | SMS | 50 ppm |
| | DMAM | 2500 ppm | DMAM | 2500 ppm | | |
| | SMS | 4351 ppm | SMS | 2050 ppm | | |
| P2 (INV) | AMD | 25% | AMD | 50% | AMD | 25% |
| | DADMAC | 50% | DADMAC | 50% | | |
| | DMAM | 2543 ppm | DMAM | 2543 ppm | SMS | 51 ppm |
| | SMS | 3459 ppm | SMS | 1678 ppm | | |
| P3 (INV) | AMD | 25% | AMD | 50% | AMD | 25% |
| | DADMAC | 50% | DADMAC | 50% | | |
| | DMAM | 2580 ppm | DMAM | 2580 ppm | SMS | 52 ppm |
| | SMS | 2064 ppm | SMS | 981 ppm | | |
| P4 (CE1) | DADMAC | 100% | — | | — | |
| | AMD | 100% | | | | |
| P5 (CE2) | DADMAC | 100% | AMD | 100% | — | |
| | PEI | 1000 ppm | MBA | | | |
| P6 (CE3) | DADMAC | 100% | AMD | 100% | — | |
| | PEI | 1000 ppm | MBA | 1000 ppm | | |
| P7 (CE4) | AMD | 50% | AMD | 50% | — | |
| | DADMAC | 50% | DADMAC | 50% | | |
| | DMAM | 2500 ppm | DMAM | 2500 ppm | | |
| | SMS | 4401 ppm | SMS | 2050 ppm | | |

Glyoxalation of Polymer 4 (CE1-A/B)

The protocol for the preparation of polymer 1-A is reproduced while varying the quantity of glyoxal added. Comparative glyoxylated polymers 4-A (CE1-A) and 4-B (CE1-B) are obtained, their composition is summarized in table 2.

Polymer 5 (CE2)

Polymer 5 (CE2) is obtained according to example 4 of document FR2987375.

Glyoxalation of Polymer 5 (CE2-A/B)

The protocol for the preparation of polymer 1-A is reproduced while varying the quantity of glyoxal added. Polymers 5-A (CE2-A) and 5-B (CE2-B) are obtained, their composition is summarized in table 2.

Polymer 6 (CE3)

Polymer 6 is obtained according to example 12 of document FR2987375.

The physicochemical properties of these base polymers obtained are described in Table 1b below:

TABLE 1b physicochemical properties of base polymers P1 to P3 according to the invention and comparative examples CE1 to CE4.

| | Molar ratio of the monomer(s) in the base polymer (mol %) | Viscosity (cps) | Molecular weight Mw (Da) |
|---|---|---|---|
| P1 (INV) | AMD/DADMAC 95/5 | 4 100 | 4 300 000 |
| P2 (INV) | AMD/DADMAC 85/15 | 4 900 | 4 190 000 |
| P3 (INV) | AMD/DADMAC 70/30 | 3 500 | 2 650 000 |

TABLE 1b-continued physicochemical properties of base polymers P1 to P3 according to the invention and comparative examples CE1 to CE4.

|  | Molar ratio of the monomer(s) in the base polymer (mol %) | Viscosity (cps) | Molecular weight Mw (Da) |
|---|---|---|---|
| P4 (CE1) | AMD/DADMAC 95/5 | 4 100 | 429 000 |
| P5 (CE2) | AMD/DADMAC 85/15 | 3 700 | 440 000 |
| P6 (CE3) | AMD/DADMAC 70/30 | 4 500 | 610 000 |
| P7 (CE4) | AMD/DADMAC 95/5 | 4 020 | 515 000 |

Table 2 describes the viscosity and the composition of the glyoxalated polymers 1 to 3 according to the invention (P1-A to P3-B) and comparative glyoxalated polymers CE1-A to CE4-B

TABLE 2

Results of viscosity of glyoxalated polymers of the invention P1-A to P3-B and comparative examples CE1-A to CE4-B.

| Base polymer | Glyoxalated polymer | Reaction time (minutes) | Glyoxalated polymer concentration (mol %) | Viscosity (cps) |
|---|---|---|---|---|
| P1 (INV) | P1-A | 58 | 2 | 39 |
|  | P1-B | 55 | 5 | 51 |
| P2 (INV) | P2-A | 62 | 2 | 37 |
|  | P2-B | 57 | 5 | 55 |
| P3 (INV) | P3-A | 54 | 2 | 40 |
|  | P3-B | 54 | 5 | 52 |
| P4 (CE1) | P4-A (CE1-A) | 57 | 2 | 38 |
|  | P4-B (CE1-B) | 50 | 5 | 55 |
| P5 (CE2) | P5-A (CE2-A) | 59 | 2 | 35 |
|  | P5-B (CE2-B) | 49 | 5 | 53 |
| P6 (CE3) | P6-A (CE3-A) | 52 | 2 | 40 |
|  | P6-B (CE3-B) | 49 | 5 | 54 |
| P7 (CE4) | P7-A (CE4-A) | 48 | 2 | 38 |
|  | P7-B (CE4-B) | 52 | 5 | 55 |

Application Testing

The wet pulp used in all of the application examples is obtained by disintegration of the dry pulp in order to obtain a final aqueous mass concentration of 1%. This is a pH neutral pulp with 100% recycled cardboard fibers.

Evaluation of the Drainage Under Vacuum (DDA) Performances

The DDA (Dynamic Drainage Analyzer) makes it possible to determine, automatically, the time (in seconds) necessary to vacuum dewater a fibrous suspension on a fabric. Polymers are added to the damp pulp (0.6 liters of pulp to 1.0% mass) in the cylinder of the DDA under stirring at 1000 rotations per minute:

T=0 s: stirring of the pulp
T=10 s: addition of the polymer(s)
T=30 s: stop of the stirring and vacuum drainage at 200 mBar for 60 s.

The pressure under the fabric is recorded as a function of time. When the water is evacuated from the fibrous mat, air passes through it which causes a slope break on the curve representing the pressure under the fabric as a function of time The time, expressed in seconds, related to this slope break on the curve corresponds to the drainage time. The shorter the time, the better the vacuum drainage is.

Performances in Dry Resistance Application, Basis Weight at 80 g·m$^{-2}$

The quantity of pulp necessary is sampled in order to ultimately obtain a sheet representing a basis weight of 80 g·m$^{-2}$.

The wet pulp is introduced into the dynamic hand sheet former tank is kept under stirring. Different compounds are injected into this pulp, according to a pre-defined sequence. In general, there is a contact time of 30 to 45 seconds between additions of polymer.

Paper hand sheets are made with an automatic dynamic hand sheet former: a blotter and a forming fabric are placed in the tank of the dynamic hand sheet former before starting the rotation of the tank at 1000 rotations per minute$^{-1}$ and building the water wall. The treated pulp is distributed on the water wall to form the fibrous mat on the forming fabric.

Once the water is drained, the fibrous mat is recovered, pressed under a press that delivers 4 bars, then dried at 117° C. The obtained sheet is packaged for one night in a room with controlled humidity and temperature (50% relative humidity and 23° C.). The dry resistance properties of all of the sheets obtained by this procedure are then measured.

Bursting strength is measured with a Messmer Buchel M 405 burst tester according to the TAPPI T403 om-02 standard.

The quantity of the polymer added is expressed in kg of active polymer per ton of dry fiber. Trials at 1.5 kg/t were conducted and are summarized in table 3. The results are expressed as a percentage of increase compared to a blank (no polymer).

TABLE 3

Comparison of the drainage and dry strength performances of the glyoxalated polymers 1 to 3 (P1-A to P3-B) according to the invention (INV) and of comparative examples polymers 4 to 6 (CE1-A to CE4-B)

|  | Glyoxalated polymer concentration (mol %) | Percentage of increase Burst (%) | Percentage of increase DBL (%) | Percentage of increase DDA (%) |
|---|---|---|---|---|
| P1-A (INV) | 2 | 21.1 | 16.5 | 12.8 |
| P1-B (INV) | 5 | 16.6 | 13.9 | 11.9 |
| P2-A (INV) | 2 | 31.1 | 21.6 | 16.0 |
| P2-B (INV) | 5 | 25.1 | 18.6 | 14.7 |
| P3-A (INV) | 2 | 39.3 | 24.7 | 19.6 |
| P3-B (INV) | 5 | 33.8 | 21.6 | 17.1 |
| P4-A (CE1-A) | 2 | 17.8 | 14.7 | 11.9 |
| P4-B (CE1-B) | 5 | 13.0 | 13.0 | 11.1 |
| P5-A (CE2-A) | 2 | 27.8 | 19.5 | 14.7 |
| P5-B (CE2-B) | 5 | 22.7 | 17.3 | 14.1 |
| P6-A (CE3-A) | 2 | 35.0 | 22.9 | 16.6 |
| P6-B (CE3-B) | 5 | 31.1 | 20.3 | 15.6 |
| P7-A (CE4-A) | 2 | 17.5 | 14.9 | 11.7 |
| P7-B (CE4-B) | 5 | 12.8 | 14.9 | 10.8 |

It is interesting to note that the polymers of the invention (P1-A to P3-B) present drainage performances (DDA) and mechanical characteristics (Burst; DBL; rupture in the dry state) that are improved in relation to a polymer prepared according to a conventional method (CE1-A and CE1-B), or a polymer of the prior art (CE2-A to CE4-B).

The invention claimed is:

1. A water-soluble dialdehyde-functionalized polymer comprising
    at least one monomer A: cationic or anionic;
    at least one monomer B: non-ionic;
    at least one structuring system comprising:
    (i) at least one compound I, selected from: allylsulfonic acid, methallylsulfonic acid, allyldisulfonic acid, methallyldisulfonic acid, salts and mixtures thereof;

(ii) at least one compound II of formula (1), different from the at least one monomer B:

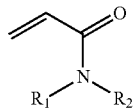

Formula (1)

$R_1$ and $R_2$ being, independently of one another, a hydrogen atom or a methyl group, an ethyl group, an isopropyl group or a $CH_2$—OH group;

$R_1$ and $R_2$ not both being a hydrogen atom;

said polymer being obtained according to the following steps:
a) formation of a solution (S1) comprising at least a first fraction (F1) containing (1) at least one monomer selected from monomers A and B and (2) at least one compound selected from compounds I and II;
b) polymerization 1 (PO1) of the fraction F1 to form a solution of a first gradient polymer (PG1);
c) addition, to the solution comprising PG1, of a second fraction (F2) containing (1) at least one monomer selected from monomers A and B and (2) at least one compound selected from compounds I and II;
d) polymerization 2 (PO2) of the fraction F2 on PG1 in order to form a solution of a second gradient polymer (PG2);
e) addition, to the solution comprising PG2, of a third fraction (F3) containing (1) at least one monomer selected from monomers A and B and (2) at least one compound selected from compounds I and II;
f) polymerization 3 (PO3) of the fraction F3 on PG2, in order to form a solution comprising a base polymer;
g) dilution of the solution comprising the base polymer and reaction between at least one dialdehyde and the base polymer in order to obtain a water-soluble dialdehyde-functionalized polymer;
at least one of the fractions F1, F2 or F3 contains at least one monomer A,
at least one of the fractions F1, F2 or F3 contains at least one monomer B,
at least one of the fractions F1, F2 or F3 contains at least one compound I and
at least one of the fractions F1, F2 or F3 contains at least one compound II;
with monomer A being distinct from a mixture of cationic monomer and anionic monomer,
when monomer A is anionic, the water-soluble dialdehyde-functionalized polymer does not comprise any cationic monomer,
when monomer A is cationic, the water-soluble dialdehyde-functionalized polymer does not comprise any anionic monomer, with the exception of compound I.

2. The water-soluble dialdehyde-functionalized polymer according to claim 1, wherein at least one of fractions F1, F2 or F3 is different from the other fractions.

3. The water-soluble dialdehyde-functionalized polymer according to claim 1, wherein the at least one monomer A is cationic.

4. The water-soluble dialdehyde-functionalized polymer according to claim 1, wherein the at least one monomer A is selected from quaternized dimethylaminoethyl acrylate, quaternized dimethylaminoethyl methacrylate, diallyldimethylammonium chloride, propyltrimethyl ammonium acrylamide chloride, propyltrimethylmethacrylamide ammonium chloride and mixtures thereof, and that the dialdehyde is selected from the group consisting of glyoxal, glutaraldehyde, furane-dialdehyde, adipaldehyde, succinaldehyde, dialdehyde starch, 2,2 dimethoxyethanal, diepoxy compounds, and mixtures thereof.

5. The water-soluble dialdehyde-functionalized polymer according to claim 1, wherein the at least one non-ionic monomer B is selected from acrylamide, acrylonitrile, methacrylamide and in that the dialdehyde is glyoxal.

6. The water-soluble dialdehyde-functionalized polymer according to claim 1, wherein it comprises between 500 and 50,000 ppm of compound I, based on to the total weight of monomers A and B;
and wherein it comprises between 500 and 50,000 ppm of compound II, based on to the total weight of monomers A and B.

7. The water-soluble dialdehyde-functionalized polymer according to claim 1, wherein compound II is selected from: N,N-dimethylacrylamide, N,N-diethylacrylamide, N,N-isopropylacrylamide, N-methylolacrylamide and mixtures thereof.

8. A paper or cardboard manufacturing method comprising adding a water-soluble dialdehyde-functionalized polymer according to claim 1 into an aqueous solution of fibers and forming a sheet of paper or cardboard.

9. A method for recovery of hydrocarbons; drilling or cementing of wells; stimulation of hydrocarbon wells; open-circuit water processing; treatment of fermentation musts; treatment of sludges; in construction; in lumber processing; treatment of hydraulic composition; in the mining industry; formulation of cosmetic products; formulation of detergents; textile manufacturing; in the geothermal sector; manufacture of sanitary napkins; or in agriculture, said method comprising adding a water-soluble dialdehyde-functionalized polymer according to claim 1 into an aqueous solution, and using the resultant solution in said method.

10. A flocculant, coagulant, binding agent, fixing agent, viscosity-reducing agent, thickening agent, absorption agent, friction-reducing agent, drainage agent, charge-retaining agent, dehydrating agent, conditioning agent, stabilizing agent, fixing agent, film-forming agent, sizing agent, superplasticizer agent, clay inhibitor or dispersant, comprising the water-soluble dialdehyde-functionalized polymer according to claim 1.

11. The water-soluble dialdehyde-functionalized polymer according to claim 2, wherein the at least one monomer A is cationic.

12. The water-soluble dialdehyde-functionalized polymer according to claim 11, wherein the at least one monomer A is selected from quaternized dimethylaminoethyl acrylate, quaternized dimethylaminoethyl methacrylate, diallyldimethylammonium chloride, propyltrimethyl ammonium acrylamide chloride, propyltrimethylmethacrylamide ammonium chloride and mixtures thereof, and that the dialdehyde is selected from the group consisting of glyoxal, glutaraldehyde, furane-dialdehyde, adipaldehyde, succinaldehyde, dialdehyde starch, 2,2 dimethoxyethanal, diepoxy compounds, and mixtures thereof.

13. The water-soluble dialdehyde-functionalized polymer according to claim 2, wherein the at least one non-ionic monomer B is selected from acrylamide, acrylonitrile, methacrylamide and in that the dialdehyde is glyoxal.

14. The water-soluble dialdehyde-functionalized polymer according to claim 12, wherein it comprises between 500 and 50,000 ppm of compound I, based on to the total weight of monomers A and B;

and wherein it comprises between 500 and 50,000 ppm of compound II, based on to the total weight of monomers A and B.

15. The water-soluble dialdehyde-functionalized polymer according to claim 14, wherein compound II is selected from: N,N-dimethylacrylamide, N,N-diethylacrylamide, N,N-isopropylacrylamide, N-methylolacrylamide and mixtures thereof.

16. A method for sequentially preparing a water-soluble dialdehyde-functionalized polymer, comprising the following steps:
   a) formation of a solution (S1) comprising at least a first fraction (F1) containing (1) at least one monomer selected from monomers A and B and (2) at least one compound selected from compounds I and II;
   the at least one monomer A being a cationic monomer or an anionic monomer;
   the at least one monomer B being a non-ionic monomer;
   the at least one compound I being selected from: allylsulfonic acid, methallysulfonic acid, allyl disulfonic acid, methallyl disulfonic acid, salts and mixtures thereof;
   the at least one compound II being of formula (1), different from at least monomer B:

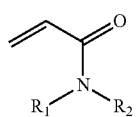

Formula (1)

$R_1$ and $R_2$ being, independently of one another, a hydrogen atom or a methyl group, an ethyl group, an isopropyl group or a $CH_2$—OH group;
   $R_1$ and $R_2$ not both being a hydrogen atom;
   b) polymerization 1 (PO1) of the fraction F1 to form a solution of a first gradient polymer (PG1);
   c) addition, to the solution comprising PG1, of a second fraction (F2) containing (1) at least one monomer selected from monomers A and B and (2) at least one compound selected from compounds I and II;
   d) polymerization 2 (PO2) of fraction F2 on PG1 in order to form a solution of a second gradient polymer (PG2);
   e) addition, to the solution comprising PG2, of a third fraction (F3) containing (1) at least one monomer selected from monomers A and B and (2) at least one compound selected from compounds I and II;
   f) polymerization 3 (PO3) of fraction F3 on PG2, in order to form a solution comprising a base polymer;
   g) dilution of the solution comprising the base polymer and reaction between at least one dialdehyde and the base polymer in order to obtain a water-soluble dialdehyde polymer;
   at least one of the fractions F1, F2 or F3 contains at least one monomer A,
   at least one of the fractions F1, F2 or F3 contains at least one monomer B,
   at least one of the fractions F1, F2 or F3 contains at least one compound I and
   at least one of the fractions F1, F2 or F3 contains at least one compound II,
   with monomer A being distinct from a mixture of cationic monomer and anionic monomer,
   when monomer A is anionic, the water-soluble dialdehyde-functionalized polymer does not comprise any cationic monomer,
   when monomer A is cationic, the water-soluble dialdehyde-functionalized polymer does not comprise any anionic monomer, with the exception of compound I.

17. The method according to claim 16, wherein at least one of fractions F1, F2 or F3 is different from the others.

18. The method according to claim 16, wherein an initiator is added continuously throughout the polymerization process, and in that the dialdehyde is glyoxal.

19. The method according to claim 16, wherein, after step f) of polymerization (PO3), the method comprises an aging step of between 10 and 100 minutes.

20. The method according to claim 16, wherein the dialdehyde reaction comprises at least the following steps:
   g1) dilution of the solution comprising the base polymer, in order to form a diluted solution of the base polymer (SD1);
   g2) optionally adjustment of the pH of SD1 to at least 10;
   g3) addition of at least one dialdehyde into the solution obtained in step g1) or g2), in order to form a diluted solution (SD2);
   g4) optionally acidification to a pH comprised between 2 and 4 of the solution obtained in step g3), in order to form a diluted solution (SD3).

* * * * *